United States Patent Office 3,482,921
Patented Dec. 9, 1969

3,482,921
COMPOSITIONS OF COPPER(I) CYANIDE AND ALKALI METAL SALTS AND AGENTS CONTAINING SAME FOR CONTROLLING AQUATIC INSECTS
Heinrich Adolphi, Limburgerhof, Pfalz, and Hans Cordes, Hambach, Germany, assignors to Badische Anilin- & Soda-Fabrik Aktiengesellschaft, Ludwigshafen (Rhine), Rhineland-Palatinate, Germany
No Drawing. Filed Oct. 4, 1967, Ser. No. 672,727
Claims priority, application Germany, Oct. 7, 1966, B 89,242
Int. Cl. A01n *11/02, 11/04*
U.S. Cl. 424—129      5 Claims

ABSTRACT OF THE DISCLOSURE

The present invention relates to compositions of copper(I) cyanide and alkali metal salts and to a method of controlling aquatic insects with these compositions.

---

It is known that aquatic insects can be controlled with contact insecticides, for example chlorinated hydrocarbons. This has the disadvantage however that these compounds are highly toxic to fish and that resistant strains of insects develop.

It is further known that complex compounds of copper halides with hydrocyanic acid and acetylene monoalcohols or dialcohols having three to six carbon atoms are strongly toxic to aquatic insect larvae and relatively nontoxic to fish.

It is an object of this invention to provide new compositions of copper(I) cyanide and alkali metal salts which are highly toxic to aquatic insects and insect larvae and nontoxic to fish.

Another object of the invention is to provide a method of controlling aquatic insects with compositions of copper(I) cyanide and alkali metal salts while not injuring fish living in the water.

These and other objects are achieved with compositions of copper(I) cyanide with alkali metal (including ammonium) salts.

The new active ingredients may be prepared by various methods. For example they are obtained when CuCN is prepared by conventional methods from copper(II) salts and alkali metal cyanide. Alkali metal salts are salts of inorganic acids, for example chlorides, bromides, sulfates, nitrates, nitrites, phosphates, phosphites, bicarbonates or carbonates of ammonia or the alkali metals, for example lithium, potassium or sodium, in water, alcohols (ethyl alcohol, methyl alcohol), ethers (diethyl ether) or other organic solvents. The amount of alkali metal salt is preferably about 0.5 to 50% by weight of alkali metal salt (with reference to the finished composition) contained in the composition of copper(I) cyanide and alkali metal salt. The composition is insoluble in almost all solvents.

Generally speaking the active ingredients may be obtained by setting up the conditions for the formation of copper(I) cyanide in the presence of an adequate amount of alkali metal salt.

As used in this specification alkali metal salts also include ammonium salts.

Compositions of CuCN and alkali metal salts which have been prepared mechanically are just as effective as the products obtained chemically.

The following recipes illustrate the preparation of the new compositions:

Recipe 1: 180 parts of copper(I) cyanide is intensely ground in a ball mill with 20 parts of ammonium chloride for twenty-four hours. The powder obtained is the active ingredient.

Recipe 2: 150 parts of copper(I) cyanide and 50 parts of sodium bromide are heated in 800 parts of ethanol at the boiling point of the ethanol for four hours with intense stirring, and then cooled. 200 parts of active ingredient is then filtered off and dried.

Recipe 3: 50 parts of copper(II) chloride dihydrate and 20 parts of ammonium chloride are dissolved in 200 parts of water, and a solution of 20 parts of sodium cyanide in 100 parts of water is dripped in under a hood which draws well. The reaction mixture formed is heated for five minutes until the water boils and then cooled. The brown colored precipitate is filtered off and dried. 20 parts of active ingredient is obtained.

Whereas pure copper cyanide has inadequate insecticidal action for practical purposes, mixtures thereof having a small content of alkali metal salts, particularly alkali chlorides, alkali bromides and alkali nitrates, have a strong insecticidal action.

When the content of alkali salts is very high, the effectiveness of the mixture diminishes because of the small content of CuCN. Best results are observed with the mixing ratios given above.

The action of the agents according to this invention is illustrated by the following examples. The experiments were carried out in the laboratory with fourth-stage larvae of the yellow fever mosquito (*Aëdes aegypti*). Outdoor experiments were carried out on larvae of the house mosquito (*Culex pipiens*) in tanks 100 cm. x 100 cm. x 50 cm. filled with water.

EXAMPLE 1

Yellow fever mosquito larvae (*Aëdes aegypti*) in the fourth larval stage were placed in water containing the amount of active ingredient given in the following table. The mortality rate of the larvae is determined after twenty-four hours. The results obtained with the agent according to German patent specification No. 1,159,688 (A) and with copper cyanide alone (B) are given for purposes of comparison. In the table:

Mixture=mixture of CuCN and alkali salt
Alk.=percentage content of alkali salt in the mixture
Conc.=concentration in p.p.m.
Mort.=mortality rate in percent.

| Mixture | Alk. | Conc. | Mort. |
|---|---|---|---|
| A | | 0.1 | 80 |
| B | 0 | 5 | 90 |
| CuCN, Na$_2$SO$_4$ | 20 | 0.025 | 100 |
| CuCN, Na$_2$SO$_4$ | 35 | 0.05 | 90 |
| CuCN, NaBr | 45 | 0.025 | 100 |
| CuCN, NaBr | 30 | 0.025 | 100 |
| CuCN, NaBr | 10 | 0.025 | 100 |
| CuCN, NaCl | 45 | 0.01 | 100 |
| CuCN, NaCl | 30 | 0.01 | 100 |
| CuCN, NaCl | 10 | 0.01 | 100 |
| CuCN, NH$_4$Cl | 45 | 0.025 | 90 |
| CuCN, NH$_4$Cl | 30 | 0.025 | 100 |
| CuCN, NH$_4$Cl | 10 | 0.025 | 100 |
| CuCN, NH$_4$Cl | 5 | 0.025 | 100 |
| CuCN, NH$_4$Cl | 1 | 0.025 | 90 |
| CuCN, NH$_4$NO$_3$ | 30 | 0.025 | 100 |
| CuCN, NH$_4$NO$_3$ | 20 | 0.025 | 100 |
| CuCN, NH$_4$NO$_3$ | 10 | 0.025 | 100 |
| CuCN, KBr | 30 | 0.025 | 100 |
| CuCN, KBr | 20 | 0.025 | 100 |
| CuCN, KBr | 10 | 0.025 | 100 |

EXAMPLE 2

The effect on larvae of house mosquitoes (*Cuplex pipiens*) was investigated in outdoor experiments in tanks 100 cm. x 100 cm. x 50 cm. filled with water.

The agent in the form of an aqueous suspension disperses uniformly in water while the agents in the form of dust are not wetted by water and float on the surface of the water which they cover uniformly. Results obtained on various observation days show that the agent according to this invention not only has a strong action generally but is also effective over a long period. The agents used are an agent according to German patent specification No. 1,159,688 (A) and a mixture of CuCN with 10% of NH$_4$Cl (C). In the following table:

AI=active ingredient
Conc.=concentration in p.p.m.
S=in suspension
Percent D=covering the surface of the water and containing the given percentage of active ingredient
Day=day of observation
Mort.=mortality rate in percent
80+=more than 80
20—=less than 20.

| AI | Conc. | Day | Mrot. |
|----|-------|-----|-------|
| A  | 0.5 p.p.m. S | 10 | 80+ |
| A  | 0.5 p.p.m. S | 14 | 20— |
| C  | 0.5 p.p.m. S | 14 | 80+ |
| A  | 0.2% D | 1 | 20— |
| C  | 0.2% D | 10 | 80+ |

The agents according to this invention may be used in the form of their aqueous suspensions or mixed with solid or liquid carriers, wetting agents, dispersing agents or adhesives, and if desired mixed with other active ingredients, in the form of dusts, wettable powders or dispersions.

We claim:

1. An insecticide composition comprising a mixture of copper(I) cyanide and about 0.5 to 50% by weight, based on said mixture, of an inorganic salt having a cation selected from the group consisting of lithium, potassium, sodium and ammonium and an anion selected from the group consisting of chloride, bromide, sulfate, nitrate, nitrite, phosphate, phosphite, bicarbonate and carbonate.

2. A composition as claimed in claim 1 wherein said salt is a chloride salt.

3. A composition as claimed in claim 1 wherein said salt is a bromide salt.

4. A composition as claimed in claim 1 wherein said salt is a nitrate salt.

5. A process for controlling mosquito larvae in a body of water which comprises contacting said larvae in said body of water with a toxic amount of at least 0.01 p.p.m. of an insecticide composition comprising copper(I) cyanide and 0.5 to 50% by weight, based on said composition, of an inorganic salt having a cation selected from the group consisting of lithium, potassium, sodium and ammonium and an anion selected from the group consisting of chloride, bromide, sulfate, nitrate, nitrite, phosphate, phosphite, bicarbonate and carbonate.

References Cited

UNITED STATES PATENTS

| 1,496,436 | 6/1924 | Steinhart | 167—42 |
| 2,101,704 | 12/1937 | Dangelmajet | 167—16 |
| 2,111,050 | 3/1938 | Magill | 167—16 |

OTHER REFERENCES

King, W. V.: "Chemicals Evaluated as Insecticides," 1954, pp. 46, 219, Washington, D.C.

Freat, D.: "Catalogue of Insecticides and Fungicides," vol. I, p. 175 (1947).

ALBERT T. MEYERS, Primary Examiner

VINCENT D. TURNER, Assistant Examiner